Nov. 26, 1957

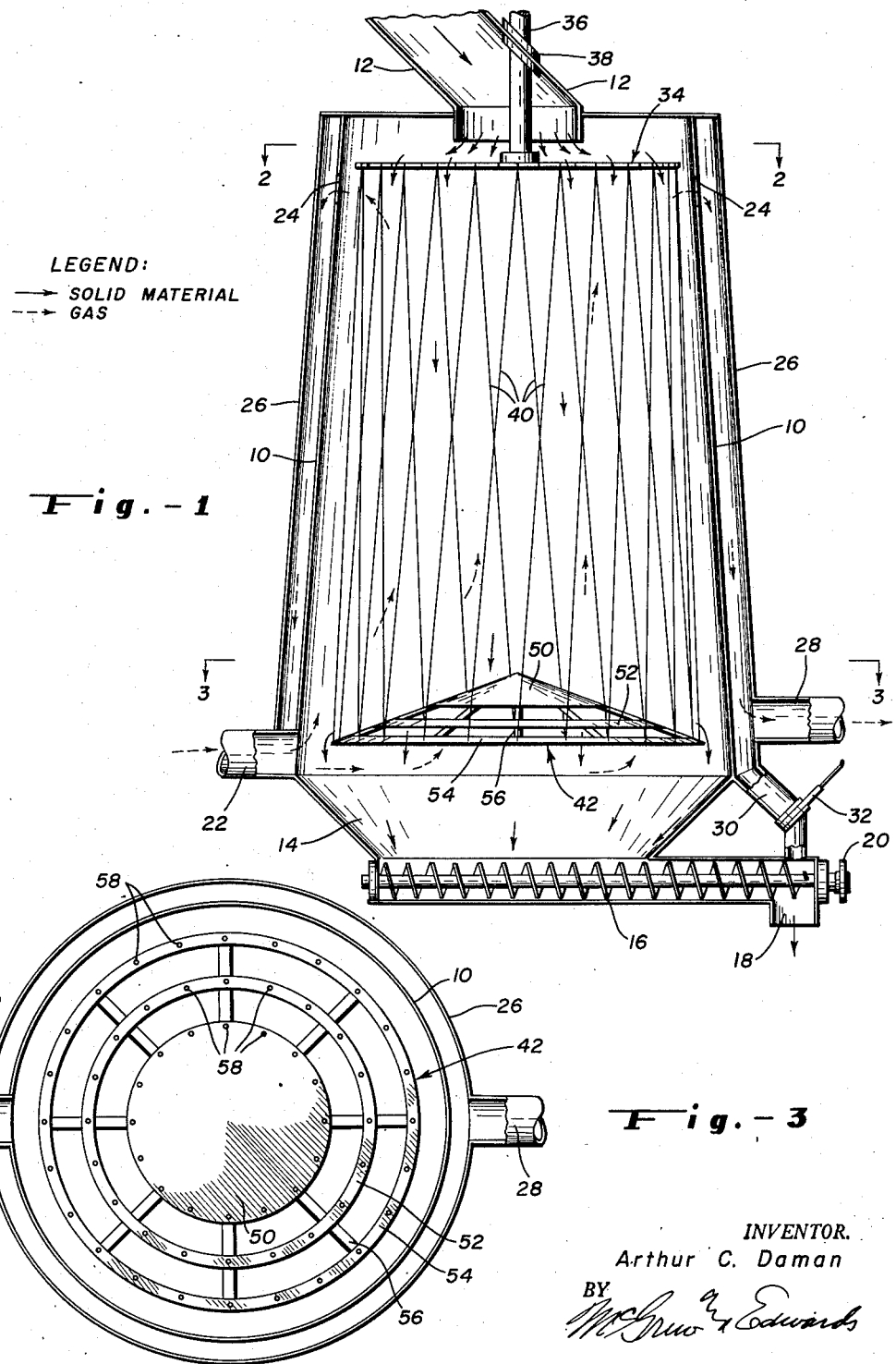

A. C. DAMAN 2,814,129

HEAT EXCHANGE APPARATUS

Filed May 2, 1955

INVENTOR.
Arthur C. Daman

BY

ATTORNEYS

Nov. 26, 1957  A. C. DAMAN  2,814,129
HEAT EXCHANGE APPARATUS
Filed May 2, 1955  3 Sheets-Sheet 3

INVENTOR.
Arthur C. Daman
BY
*McGrew & Edwards*
ATTORNEYS

2,814,129

HEAT EXCHANGE APPARATUS

Arthur C. Daman, Denver, Colo., assignor to Mining Process and Patent Company, Denver, Colo., a corporation of Delaware Application May 2, 1955, Serial No. 505,380

11 Claims. (Cl. 34—68)

This invention relates to heat exchange apparatus and more particularly to heat exchange apparatus for the treatment of moist, finely divided solids in a gaseous medium.

Many finely divided moist materials may be satisfactorily treated with air or other gases, but due to the physical nature of some of the materials, they cannot be satisfactorily handled by conventional apparatus. The present invention provides means for intimately admixing small portions of material with a stream of air or gas with a sufficient time of exposure to the gaseous medium to complete the required treatment. After such treatment, the material falls out of the stream and may be recovered. Sticky and tacky material, as well as moist granular material, may be effectively treated with the apparatus of the present invention. The apparatus may be utilized as a drier for the moist material, wherein heat is applied to the material to deplete it of its moisture. It may, also, be used as a cooler where hot solid feed may be cooled by the gas flowing through the device. It may, furthermore, be utilized for treating solids with various gases where a solid is to be intimately mixed and saturated with a gas or with a vaporized liquid.

The apparatus of the present invention comprises, in general, a chamber in which small portions of moist solids are permitted to drop from the top of the chamber toward the bottom. A stream of gas is passed upwardly through the drier so that the solids may be intimately mixed with the gas in a heat interchange relationship. The free drop of the solids is interrupted at least once in their descent from the top to the bottom by means of baffles arranged to contact substantially all of the falling solids. The interruption of the free fall increases the contact time of the solids with the gas, and, also, aids in the mixing of the gas with all portions of the solids. The baffles or interrupting surfaces may be made in a variety of shapes and forms, and they are arranged to move during operation so as to prevent build-up of solid material on the surfaces. The movement of the surfaces may be any type of movement so long as it is sufficient to prevent build-up of material thereon and it will permit the surfaces to intercept the drop of substantially all of the material. Material entering the top of the chamber is so distributed that the concentration of the falling particles is substantially uniform across the cross-sectional area of the chamber.

In general, the device of the present invention includes a chamber providing a confined zone for the passage of a stream of gas therethrough. The gas is normally directed from the bottom to the top of the chamber to provide a counter-current relation with material to be treated. The material is introduced into the top of the chamber and is distributed across a cross-sectional area thereof, and it is permitted to fall toward the bottom of the chamber where it is withdrawn from the treatment zone. Means are provided in the chamber to intercept at least once the free fall of material, whereby substantially all of the material is prevented from passing directly from the top to the bottom in an unimpeded path. Heat exchange means are provided as by the stream of gas being at a different heat level than the material, or by various radiation, conduction, or convection systems.

In one preferred form, the apparatus is utilized to reduce the moisture content of sticky materials which are friable when their moisture content is sufficiently lowered. In this case, a stream of gas is heated for evaporating moisture from the solid material. A maze of vibrating cables is provided between the top feed inlet and the bottom product discharge for intercepting the falling material. The particles of the feed fall onto the cables and stick until sufficiently dry to flake or crumble off under the impetus of the vibration. The cables may be so arranged that material falling from one portion of the cable may fall onto a portion of an adjoining cable, thereby providing multiple interruptions of the free fall. In the downward travel through the chamber, the solids are thoroughly contacted with the heating gas and a substantially dry product is recovered from the bottom of the chamber.

Included among the objects and advantages of the present invention is an apparatus for intimately contacting small portions of feed material with a stream of gas. The device provides means for intimately admixing a free falling feed with a rising stream of gas so that all portions and surfaces of the feed material are contacted with the gas. The device provides a free falling path for the feed material, interrupted at various points along the falling path so as to provide a predetermined contact time of the feed material with the gaseous medium. The device provides a rapid heat exchange interrelationship between the feed material and the treating gaseous medium.

These and other objects and advantages may be more readily apparent by reference to the following description and appended drawings in which:

Fig. 1 is a partial cross-sectional elevation of a device according to the invention;

Fig. 3 is a top plan view of a lower spider according to the invention, taken along section line 3—3 of Fig. 1;

Figure 4:
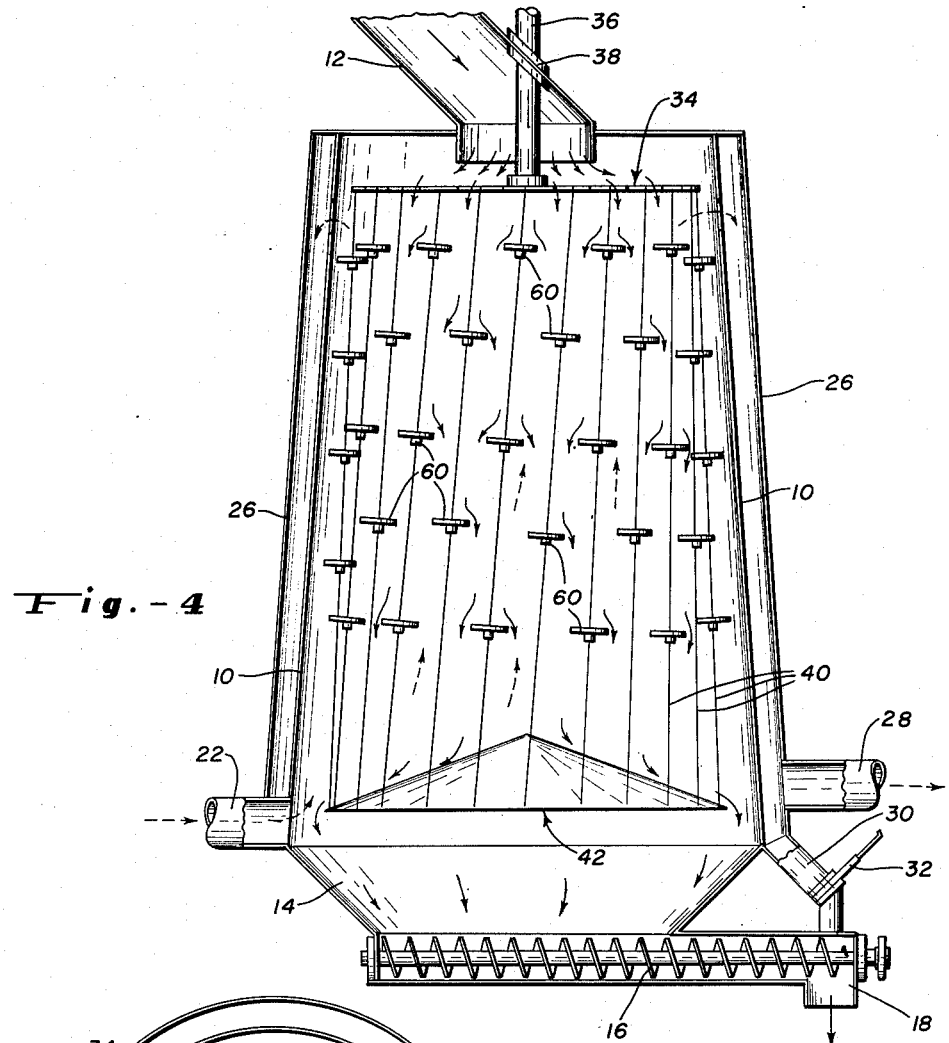
Fig. 4 is a partial sectional elevation of a modified device according to the invention.

In the device illustrated in Fig. 1, the apparatus comprises a chamber 10 having a wall sloped inwardly from the bottom to the top thereof in substantially the form of a truncated cone. A feed inlet 12 is provided at the top of the chamber 10 and a bottom discharge cone 14 is provided at the lower end of the chamber. A spiral flight conveyor 16 removes accumulated solid from the discharge 14 through an outlet 18. The spiral flight conveyor is rotated by means of a pulley 20, which is connected to any suitable drive means, not shown. A lower gas inlet 22 is provided above but adjacent the bottom of the chamber, and a series of gas outlets 24 are provided in the upper portion of the chamber. A jacket 26 is provided around the chamber 10, and gas exhausting from the chamber 10 passes through the space between the jacket 26 and the chamber 10 to a lower outlet 28.

Figure 2:
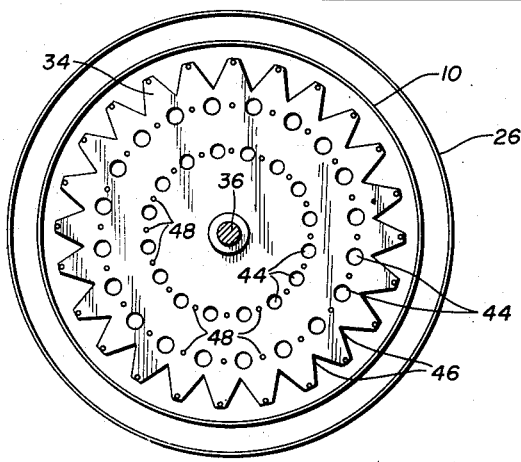
Fig. 2 is a top plan view of a distributing plate taken along section line 2—2 of Fig. 1, showing the holding means for baffle cables of the device.
Figure 8:
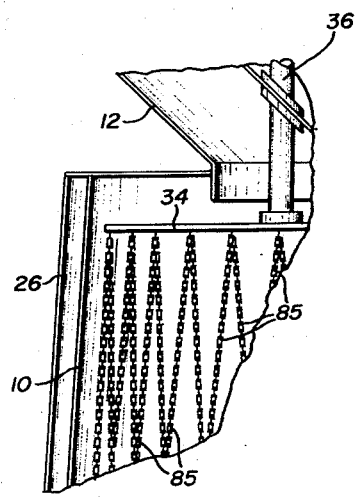
Fig. 8 is a detailed section of a modified form of the elongated members of the invention.

A dust trap 30, controlled by a gate valve 32, collects dust which is discharged into outlet 18 with the treated material. An upper distributing plate 34, illustrated in detail in Fig. 2, is spaced adjacent to but below the feed inlet 12. The distributing plate 34 is mounted on a shaft 36 which extends through a stuffing box 38 into the feed box and into the chamber 10. A plurality of flexible cables 40 are secured to the distributing plate and extend therebelow at an angle to the vertical. The lower end of the cables is secured to a conical spider 42 in the lower portion of the chamber 10. The spider is illustrated in detail in Fig. 3. The distributing plate 34 is a perforate plate having a series of circular feed openings 44 spaced in circular arrangement around the shaft 36. The circumference of the distributing plate 34 is serrated by a series of notches 46 which provide feed openings on the periphery. A plurality of cable supporting holes are interspersed between the feed holes 44 and, also, the serrations 46. The cable supporting holes are symmetrically placed on the plate, and are so positioned as to provide a single cable supporting hole between two feed holes. The cables 40 are passed through the cable holes 48 and are secured to the plate by means of suitable clamps. The spider 42 comprises an inner conical member 50 and annular rings 52 and 54 mounted on the radial supports 56. A series of cable holes 58 are spaced around the annular rings 52, 54 and the peripheral edge of the cone 50. The cables 40 are passed through the cable holding holes 58 in the spider 42 and are secured thereto by means of clamps and the like. The cables are mounted at an inclination to the vertical in such a manner that a cable intercepts the free line of fall from each of the feed distributing holes 44 and notches 46. By having a portion of the cable directly below each of the feed holes 44 and the notches 46, material which passes through the holes or the notches contacts the cable and breaks the free fall of the material. Sticky material will adhere to the cable. The shaft 36 provides means for imparting motion to the cables so as to remove treated material. The cables may be vibrated or provided with an oscillatory movement, or with a suitable movement which will loosen the material on the cable. The cables are shown slightly inclined to the vertical so that the cables are substantially vertical; however, by extending the cables at more of an angle, material dropping from the distributing plate may intercept two or more cables in the fall from the top to the bottom of the chamber. With vibrating cables, the material which drops from the distributing plate is thoroughly mixed with the rising gas since contact with the cable tends to break up lumps and further disperse the material into the gas. The cables 40 may be replaced by chains 85, as shown in Fig. 8, which provide more surface for arresting the material dropping through the chamber. Also, the chains are normally subject to more violent movement from the vibration action of the spiders, due to the jointed construction of the chains, and hardened material, therefore, is generally more easily removed.

When the device is used as a drier, hot gas is introduced into the chamber 10 through the inlet 22, the gas passes upwardly through the chamber through the outlets 24 into the jacket portion 26 and out the gas exhaust 28. Material is fed into the upper feed inlet 12 onto the distributing plate 34. Moist pulp passes through the feed holes 44 in the distributing plate 34 and through the notches 46 in the periphery of the distributing plate. Material falls by a free gravitational flow, and the cables 40 which are arranged so as to have a surface portion lying directly below each of the feed holes and each of the notches intercepts the material. If it is sticky, the material will stick to the cable. The cables are vibrated by means of the shaft 36. Material which strikes the cable and sticks dries in the hot gas, and the vibration crumbles and flakes off the dried material. The dried material falls through the rising gas into the bottom outlet 14. The dry material is discharged by means of a spiral flight conveyor through the lower discharge 18. Dust which is picked up by the rising gas is separated from the gas in the jacket, and it is collected in the dust trap 30. The dust is released to the outlet 18 by manually operating the valve 32. Where it is desired, the cables may be electrically heated to further aid the drying of the adhering material. Also, various other types of heating arrangements may be utilized, for example, a heated jacket, infrared lamps spaced about the wall of the chamber pointed inwardly to heat the interior of the chamber, and similar heating devices known in the art.

Figure 5:
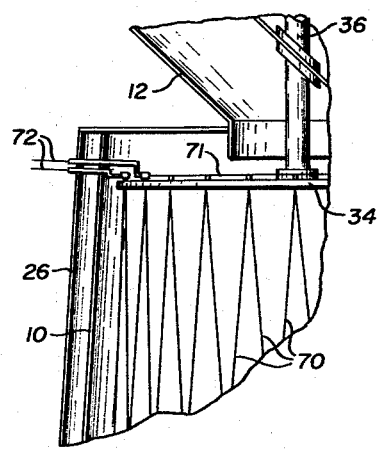
Fig. 5 is a partial, detailed section of a modified heating means.

The modification of the device shown in Fig. 5 includes electric heating cables 70 interconnected together at the top by bus bars 71, or other suitable connecting means, and a similar arrangement is used for connecting the cables together on the bottom spider, such connections not being shown. Flexible electric leads 72 provide means for introducing a desired current to the heating cables, as is well known in the art. Circulating fluid may, also, be used to heat the elongated members as illustrated in another modification shown in Fig. 6. Elongated tubular members 75 are interconnected together by U-shaped connectors 76 mounted above the top of spider 34 and at the bottom spider by similar connectors (not shown) forming a continuous conduit for the fluid. Flexible connector 77 and flexible connector 78 provide inlet and outlet connections for the fluid circuit in the chamber. A still further method of heating the chamber is shown in the modification of Fig. 7, where banks of infra-red lamps 79 are mounted in the wall 10 of the chamber. The lamps are supplied with electric current by means of leads 80 which are interconnected to power lines (not shown).

In certain instances it may be desired to utilize the apparatus as a cooling device for molten material. For such use, the hot molten feed is introduced into the chamber through the feed launder 12 onto the distributing plate 34, and cold gas is passed upwardly through the material falling from the distributing plate. The molten material flowing through the holes of the distributing plate falls on and adheres to the cables, and as the material hardens on contact with the cold gas, the vibration or motion of the cables shakes the frozen material.

Figure 6:
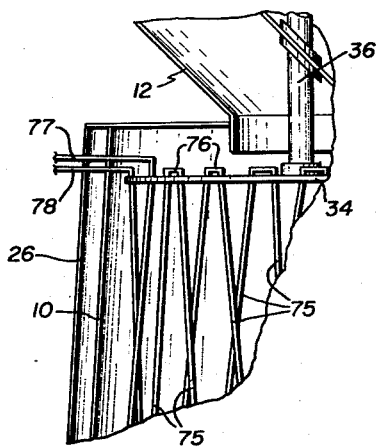
Fig. 6 is a partial, detailed section of another modified heating means.
Figure 7:
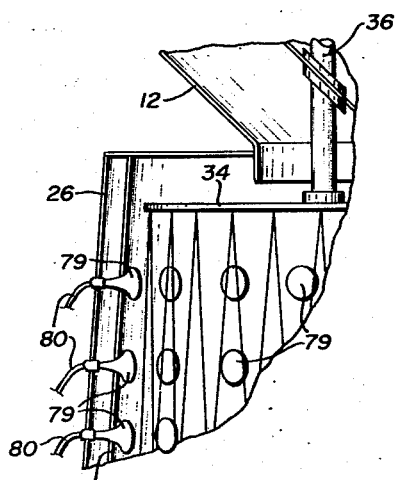
Fig. 7 is a detailed section of still another modification of heating means.

The cables may be replaced by hollow rods, tubes 75, or the like, as shown in Fig. 6, and heating or cooling media may be passed through the hollow members to further aid in cooling the molten material. The spider is so arranged that any material falling thereon will not accumulate but will fall off into the discharge. By venting the upper gas outlets 24 through the jacket 26, a fluid tight jacket may be obtained in which heating or cooling media may be passed to further aid the heat exchange treatment of the material.

The device may be also utilized in the special treatment of saturating a solid with a gas. In this case, the operation is similar to the operation of the device as a drier. The gas for the treatment is passed upwardly through the device in the manner described above. By having the solid material freely falling in the gas, all surfaces of the solid particles are intimately contacted with the gas in the chamber. The particles on contacting the cable are further dispersed and are thoroughly saturated with the gas. The solid material is then recovered through the lower discharge by means of a spiral conveyor. In any case, the use of the device involves the essential characteristic of having a free falling solid feed in a gaseous medium, and baffle means to prevent a free fall without interruption in the chamber.

In the modified device illustrated in Fig. 4, a series of small discs 60 are secured to the cables at various points. The chamber 10 is provided with a jacket 26 and a gas inlet 22 and an outlet 28, similar to the device illustrated in Fig. 1. Where the feed inlet is granular or sandy, the discs will prevent the free fall of the granular material from the distributing plate to the bottom of the chamber. The granular material falls through the holes in the distributing plate and contacts the discs where the material is further distributed into the rising gas. The material which is retained on the discs is quickly removed by the movement of the cables.

The cable or elongated member arrangement is moved throughout the operation of the device to prevent the buildup of material which contacts the members. The movement may be an oscillating or a shaking movement so as to prevent build-up of material thereon. The lower spider may be merely suspended by means of the cable attachment. The flared bottom of the chamber prevents the oscillating cables from striking the bottom of the wall of the chamber. The cables may be variously suspended or connected to the distributing plate and the lower spider, and various means of moving or vibrating the cables may be used. The important thing is to keep the cables in motion so as to prevent the build-up of material on the cables, and to further distribute the material throughout the volume of the chamber as the material falls from the top to the bottom.

While the invention has been described by reference to particular embodiments, there is no intent to limit the concept to the precise details so illustrated except insofar as set forth in the following claims.

I claim:

1. A drier of the character described, in combination, a substantially closed chamber having internal walls sloped inwardly from the bottom to the top thereof, gas inlet means at the bottom and gas outlet means at the top of said chamber for passing a stream of gas upwardly therethrough, material feed means in the top of said chamber, distributor means associated with said feed means for distributing feed across the cross-sectional area of said chamber and for providing a plurality of small streams of material falling therefrom, a plurality of generally upright and inclined rod-like members disposed downwardly from said feed distributor means and each arranged to intercept a stream of material falling from said distributing means so as to prevent a free fall to the bottom of said chamber, means for removing material from the bottom of said chamber, and means for moving said elongated members so as to prevent accumulation of material thereon.

2. A drier of the character described, in combination, a substantially closed chamber having internal walls sloped inwardly from the bottom to the top thereof, gas inlet means at the bottom and gas outlet means at the top of said chamber for passing a stream of gas upwardly therethrough, material feed means in the top of said chamber, distributor means associated with said feed means for directing feed across the cross-sectional area of said chamber and for providing a plurality of small streams of material falling therefrom, a plurality of generally upright and inclined rod-like members disposed downwardly from said feed distributing means and each arranged to intercept a stream of material falling from said distributing means so as to prevent a free, straight line fall to the bottom of said chamber, means for removing material from the bottom of said chamber, heating means for heating the material in said chamber, and means for vibrating said elongated members so as to prevent accumulation of material thereon.

3. A drier according to claim 2 in which the elongated members are heated to provide the heating means.

4. A drier according to claim 3 in which the elongated members are electrically heated.

5. A drier according to claim 3 in which the elongated members are heated by circulating fluid.

6. A drier according to claim 2 in which heating elements are provided in the wall of said drier to provide said heating means.

7. A drier according to claim 6 in which the heating elements are infrared lamps.

8. Heat exchange apparatus for the treatment of moist solid mixtures in solids-gas heat exchange relationship, comprising a substantially closed, upright chamber having a top feed inlet for moist solids and a bottom discharge outlet for treated solids, said chamber being of a truncated conical shape with its base in lowermost position, movable, suspended distributor means in the upper portion of said chamber disposed between said inlet and said outlet for directing said solids in a plurality of small streams in a directional fall over a substantial portion of the cross-sectional area of said chamber, a series of elongated inclined and generally upright rod-like members disposed within said chambers between said inlet and said outlet and collectively arranged to provide steeply sloped surfaces interrupting at least once the gravitational descent of the streams of solids directed downwardly by said distributor means, said upright members being mounted on said distributing means at the upper ends thereof and a lower spider at the lower ends thereof, said upright members being collectively mounted for vibrating movement, said members being circumferentially spaced sufficiently one from the other to provide passages for ascending movement of the gas in counter-current heat exchange relationship with said descending solids, an inlet for gas in the lower portion of said chamber, and an outlet in the upper portion of said chamber for discharging gas rising through the heat exchange zone.

9. Apparatus according to claim 8 in which the elongated upright members include a plurality of small horizontally disposed baffle plates mounted on said members and spaced relative to one another through the extent of the elongated members.

10. Apparatus according to claim 8 in which the elongated members are chains.

11. Apparatus according to claim 8 in which the elongated members are flexible cables.

References Cited in the file of this patent

UNITED STATES PATENTS

| | | |
|---|---|---|
| 256,503 | Robinson | Apr. 18, 1882 |
| 692,199 | Greene et al. | Jan. 28, 1902 |
| 971,559 | Provost | Oct. 4, 1910 |
| 1,000,120 | Provost | Aug. 8, 1911 |
| 1,632,180 | Forrest | June 14, 1927 |
| 2,633,412 | Eweson | Mar. 31, 1953 |
| 2,633,413 | Eweson | Mar. 31, 1953 |